United States Patent [19]

Martin

[11] Patent Number: 4,620,616

[45] Date of Patent: Nov. 4, 1986

[54] COOLING DEVICE FOR DISC BRAKES, ESPECIALLY FOR AUTOMOTIVE VEHICLES

[75] Inventor: Roland Martin, Aalen-Unterkochen, Fed. Rep. of Germany

[73] Assignee: Dr. Ing. H.c.F. Porsche Aktiengesellschaft, Stuttgart, Fed. Rep. of Germany

[21] Appl. No.: 620,565

[22] Filed: Jun. 14, 1984

[30] Foreign Application Priority Data

Jun. 16, 1983 [DE] Fed. Rep. of Germany ....... 3321750

[51] Int. Cl.$^4$ .......................................... F16D 65/847
[52] U.S. Cl. .................... 188/71.6; 188/218 XL; 188/218 A; 188/264 AA; 301/6 CS
[58] Field of Search ........... 188/71.6, 218 XL, 218 A, 188/264 R, 264 A, 264 AA; 192/113 A; 301/6 CS, 6 CF

[56] References Cited

U.S. PATENT DOCUMENTS

| 2,603,316 | 7/1952 | Pierce | 188/218 XL |
| 4,361,358 | 11/1982 | Bonniwell et al. | 301/6 E |
| 4,503,944 | 3/1985 | Burckhardt et al. | 188/71.6 |
| 4,533,184 | 8/1985 | Müller et al. | 301/63 R |

FOREIGN PATENT DOCUMENTS 3025757 2/1982 Fed. Rep. of Germany .
3120021 12/1982 Fed. Rep. of Germany .
1230169 4/1971 United Kingdom .

*Primary Examiner*—Bruce H. Stoner, Jr.
*Assistant Examiner*—Richard R. Diefendorf
*Attorney, Agent, or Firm*—Barnes & Thornburg

[57] ABSTRACT

A cooling device is provided for a vehicle having disc brakes which are disposed within a wheel rim cover portion of the vehicle's wheels. One type of disc brake for which the cooling device is designed is that type having generally radially extending internal air ducts between its friction rings through which air can flow for cooling the brake. The air is supplied to the brake through overflow ducts in the vehicle's wheel hub, and is conducted via a guide device from the inside of the wheel, through the brake unit. The guide device includes an air guide housing which surrounds the brake disc generally on all sides in a close, spaced relation to the disc. First and second external air ducts are formed between a wall of the housing and the friction rings of the brake disc. The housing includes an outer member having at least two influx openings. The influx openings conduct air, from inside the wheels, to the overflow ducts in the wheel hub, the external ducts, and the internal ducts. The wheel rim cover portion includes a plurality of external openings which are disposed adjacent the efflux openings of the housing and are aligned therewith to conduct air from the efflux openings to the aligned openings in the wheel rim cover portion and ultimately to an area outside the wheel.

14 Claims, 8 Drawing Figures

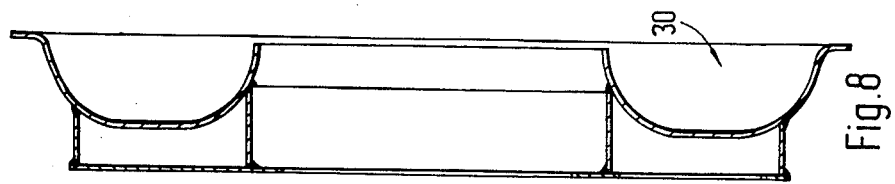
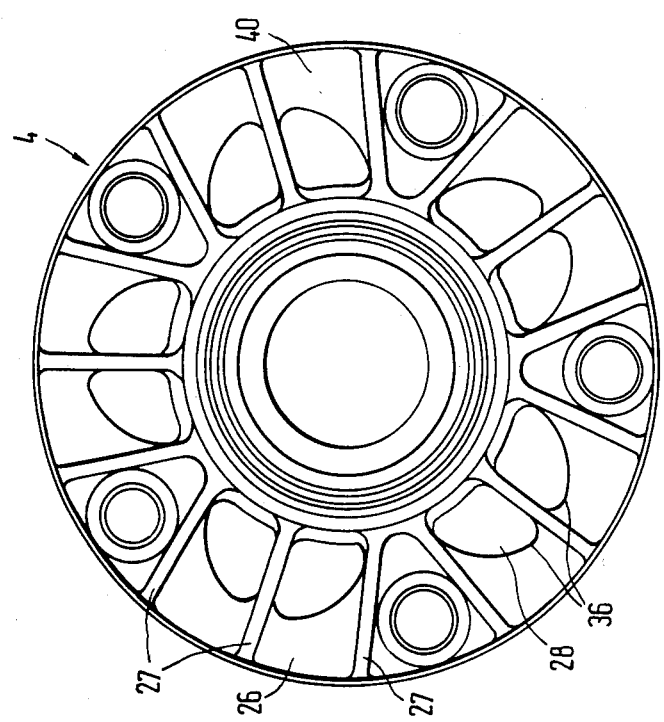
Fig. 8
Fig. 4
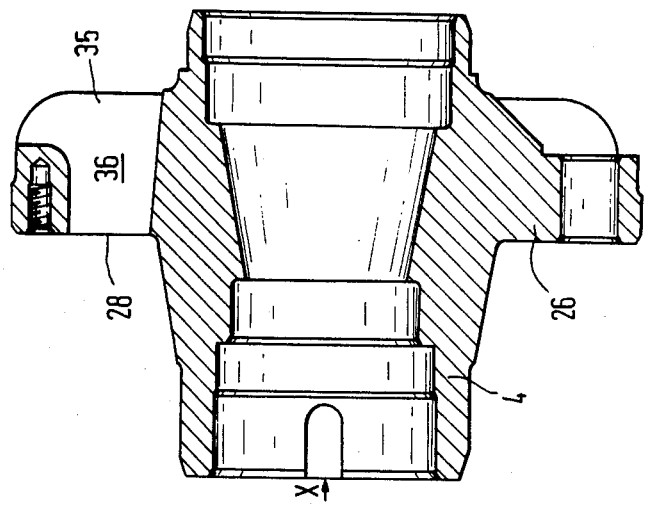
Fig. 3

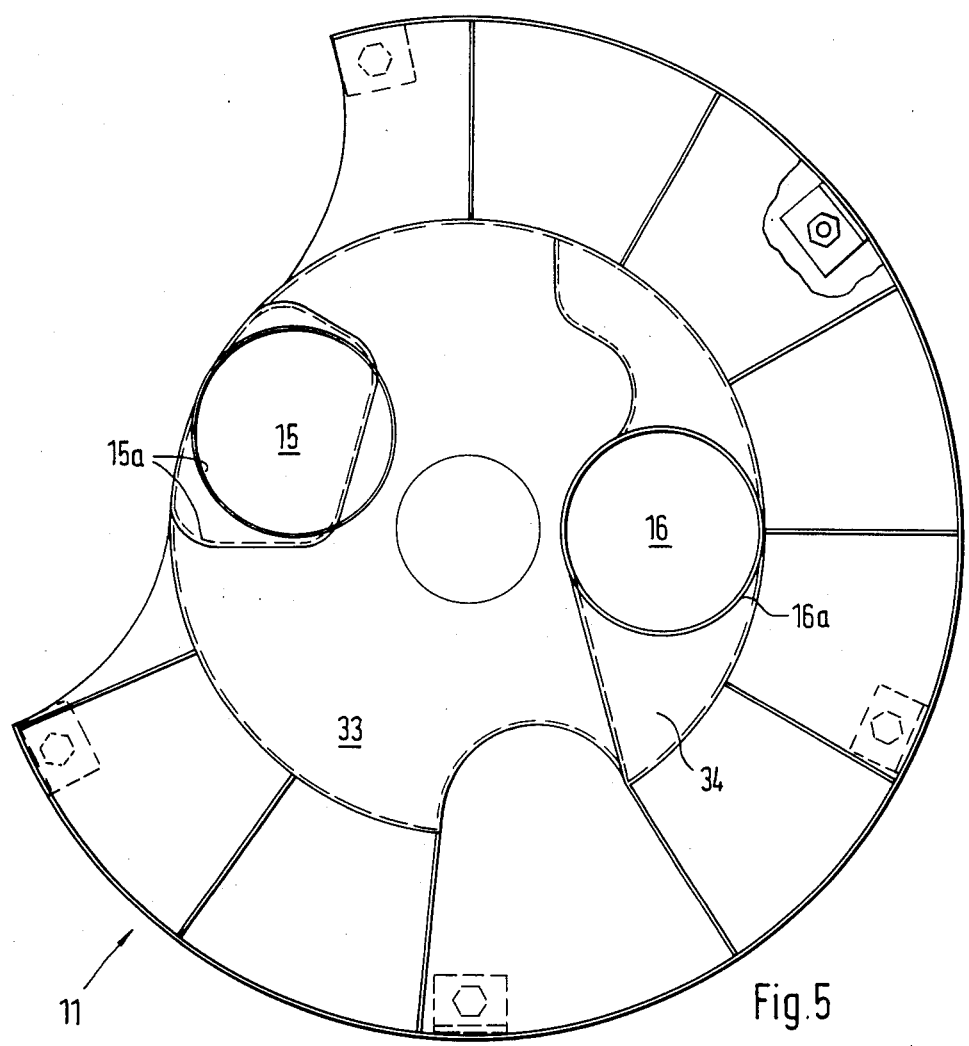
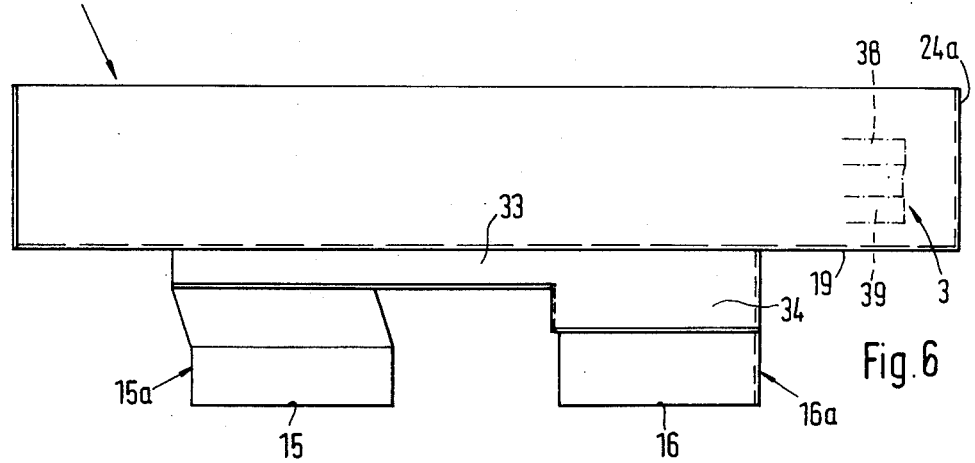

COOLING DEVICE FOR DISC BRAKES, ESPECIALLY FOR AUTOMOTIVE VEHICLES

BACKGROUND AND SUMMARY OF THE INVENTION

The present invention relates to a cooling device for disc brakes, and more particularly to a guide means for cooling automotive disc brakes by conducting air through and around the disc brakes.

One cooling device for solid disc brakes is disclosed in German Unexamined Published Patent Application (DE-OS) No. 31 20 021. In the '021 specification, a device is disclosed which utilizes a fan wheel to produce an air circulation from the inside of the wheel toward the outside of the wheel. A dish-like cap is provided on the inside of the wheel in order to obtain positive circulation of the air. The dish-like cap partially surrounds the brake unit, and provides a wide spacing between the cap and the brake unit. The cap extends upwardly to the central plane of the brake disc. The air is conducted into the cap via a peripheral influx opening, and is removed from the cap by way of air passage ducts in the base of the brake disc. Additionally, air is conducted toward outer openings on the rim side of the brake disc through the open side of the hub. This known arrangement conducts the cooling air stream generally over only the internal surface and the rims of the brake disc, thereby producing only a unilateral cooling of the brake disc. Only a minor cooling flow is directed toward the friction surface of the brake disc facing the rim recess. Only a minor cooling flow is conducted across the friction surface because there is no positive conductance of air in the region of the friction surface to provide a direct passage of cooling air flow across the friction surface. Rather, the already heated air coming from the inside of the wheel is introduced into the space between the rim recess and the corresponding brake disc surface, so that the air is incapable of providing a substantial cooling action in this zone.

Another cooling device is described in German Unexamined Patent Application (DE-OS) No. 30 25 757. The '757 specification describes a cooling device for an internally vented brake disc of an automotive vehicle wherein air circulation takes place from the outside of the brake disc toward the inside. In this arrangement, the air is conducted through external openings in the wheel hub toward an internal duct between the friction rings of the brake disc. In this design, the cooling air stream is conducted into the inner space of the rim toward the brake unit without any direct guidance. As a consequence, the cooling air stream is distributed in an uncontrolled fashion, thereby providing little cooling for the brake disc.

It is an object of the present invention to provide a cooling device of the above-described type which provides an effective cooling of the brake disc and of the wheel parts which are in heat contact with the brake discs.

In accordance with the present invention, a cooling device is provided for a motor vehicle having a wheel which includes a rim cover portion having at least one opening, a wheel hub having hub air duct through which air can pass, and a disc brake unit including a disc member having first and second friction rings, and at least one radially extending air duct disposed between the first and second friction rings. The cooling device comprises guide means for conducting air into the wheel duct, through the disc brake unit, and out through the wheel rim cover opening for cooling the disc brake unit. The guide means comprises an air guide housing means which generally encloses the disc brake unit, for forming external air ducts externally of the friction rings. The housing means includes influx openings which are positioned for conducting air to the hub air duct, the external air ducts, and the radially extending air duct. Efflux openings are provided which are cooperatively positioned with the wheel rim cover openings to conduct air from the housing means to the rim cover openings.

One aspect of the present invention is that the cooling air stream flows around the brake disc in a space defined by a guide means housing which is placed in generally close proximity to the brake disc. This arrangement promotes the optimum cooling of the brake disc and the removal of heat from all sides of the brake disc, including the outside and the inside of brake discs. To attain an optimum cooling effect, it is advantageous to variably distribute the cooling air around the brake disc. The applicant has found that the quantity of air which is conducted past the outside surfaces of the friction rings is preferably less than the quantity which is conducted past the radially extending internal duct between the friction rings of the brake disc.

The wheel has an outer shape which is designed to produce a relative vacuum situation adjacent the outer portion of the wheel, and a relative overpressure situation adjacent the inside of the wheel. This relative vacuum/overpressure arrangement promotes air circulation through the cooling device. Alternatively, enhanced air circulation can be obtained by providing a fan or suction removal means to promote the flow of air to the cooling device.

One feature of the present invention is that the air guide housing means can be made of a synthetic resin material having adequate temperature stability. This feature has the advantage of enabling the manufacturer to produce the housing means economically.

Another feature of the present invention is that the guide means provides unheated air to several partial air streams, with these partial air streams being fed directly to the individual regions of the brake discs to be cooled. For example, an air stream which is drawn into the influx openings of the device can be subdivided into four partial air streams. Of these four partial air streams, two are conducted to the outer surfaces of the friction rings, and the other two are conducted to the radially extending duct between the friction rings. Additionally, one or more partial air streams can be conducted inside of the wheel through ducts in the wheel hub, which helps to cool the wheel hub and adjoining wheel elements. By dividing the incoming air stream into four partial air streams, each region of the brake disc can be exposed to a cooling air stream which has not been heated by contact with hot portions of the brake or wheel assembly.

It is also a feature of the present invention to provide at least two influx openings which are arranged in the outer part of the housing. These influx openings are preferably located on each side of the wheel hub. An accelerated introduction of cooling air into the device can be achieved by orienting the inlet of the influx openings in opposition to the head wind, to thus obtain and enhance the delivery of cooling air to the openings. This feature has the advantage of enabling the device to deliver a generally uniform flow of cooling air to the brake unit.

BRIEF DESCRIPTION OF THE DRAWINGS

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which:

FIG. 3 is a sectional view of a wheel hub;

FIG. 4 is a plan view of the wheel hub as seen from the direction indicated by arrow X of FIG. 3;

FIG. 5 is a frontal view of the outer member of the housing;

FIG. 6 is a top view of the outer member of the housing shown in FIG. 5;

FIG. 8 is a sectional view through an air guide cap.

DETAILED DESCRIPTION OF THE DRAWINGS

Figure 1:
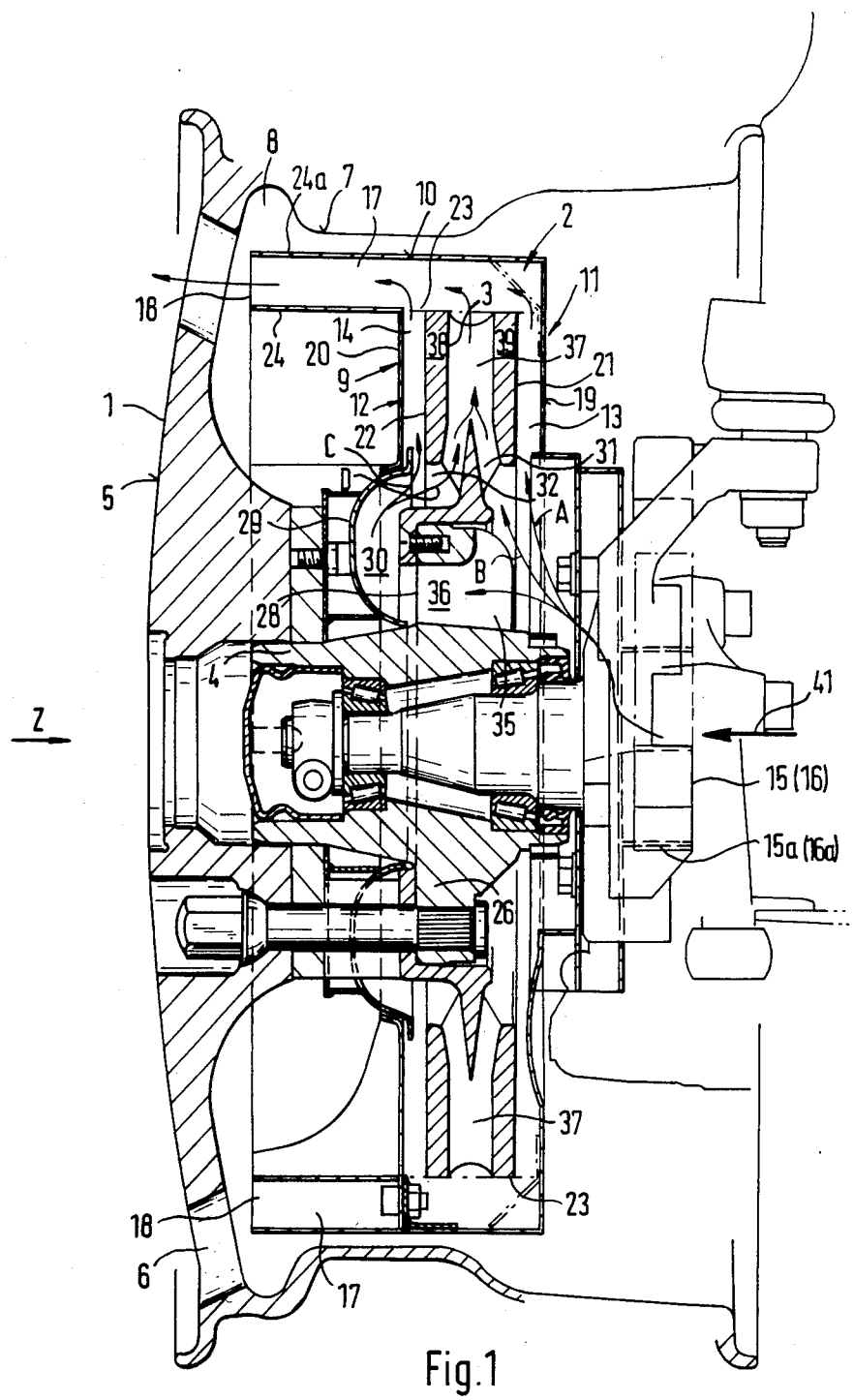
FIG. 1 is a sectional view showing the cooling device of the present invention in a vehicle wheel.

A brake unit 2 which is disposed adjacent the wheel 1 of an automotive vehicle is shown in the figures. The brake unit 2 comprises an internally vented brake disc 3 which is mounted to a wheel hub 4. The wheel 1 has a generally circular rim portion and an outwardly curved wheel rim cover 5. Wheel rim cover 5 includes several external openings 6. The brake unit 2 is retained in a space 8 which is defined by the wheel rim cover 5 and a radially interior surface 7 of the wheel rim. The brake unit 2 includes a brake disc 3 which is equipped with an air guide means 9. Guide means 9 includes an air guide housing 10 which generally surrounds the brake disc 3 to substantially enclose the brake disc 3. The housing 10 is maintained in a spaced relation from the brake disc 3 to provide a generally small space between the housing 10 and the brake disc 3. The housing includes a cup-shaped outer member 11 which is held on the inside of the wheel 1. The housing 10 also includes cup-shaped inner member 12 which is disposed between the outside of the brake unit and the wheel rim cover 5. The cup-shaped inner member 12 is joined to the outer member 11.

The outer member 11 includes influx openings 15 and 16 which are formed by pipe sections 15a and 16a, and also includes efflux ducts 17. Efflux ducts 17 include terminations (openings 18) adjacent, and aligned with, the external openings 6 of the wheel rim cover 5. The brake disc 3, wheel hub 4, and housing 10 are cooperatively positioned to provide several ducts 13, 14, 17, and 37 between the outer and inner members 11 and 12 of the housing 10. As best shown in FIG. 1, these several ducts 13, 14, 17, and 37 provide at least four partial cooling air streams a, b, c, and d which are recombined in ducts 17 and exit together through openings 18. The housing members 11, 12 are designed in conjunction with the shape of the brake disc 3 to form the external air ducts 13, 14 between the housing 10 and the friction rings 38, 39 and to form the efflux ducts 17. The outer member 11 includes a vertical interior wall 19, and the inner member 12 includes another vertical interior wall 20. Walls 19 and 20 extend at a small parallel distance from the surfaces 21 and 22 of the friction rings 38 and 39 of the brake discs 3. The walls 19 and 20 and surfaces 21 and 22 of the friction rings 38 and 39 define first 14 and second 13, axially opposed, radially extending external air ducts. Each duct 13 and 14 extends over the entire area of its respective friction ring 39, 38 and forms an almost continuous, annular chamber.

Figure 2:
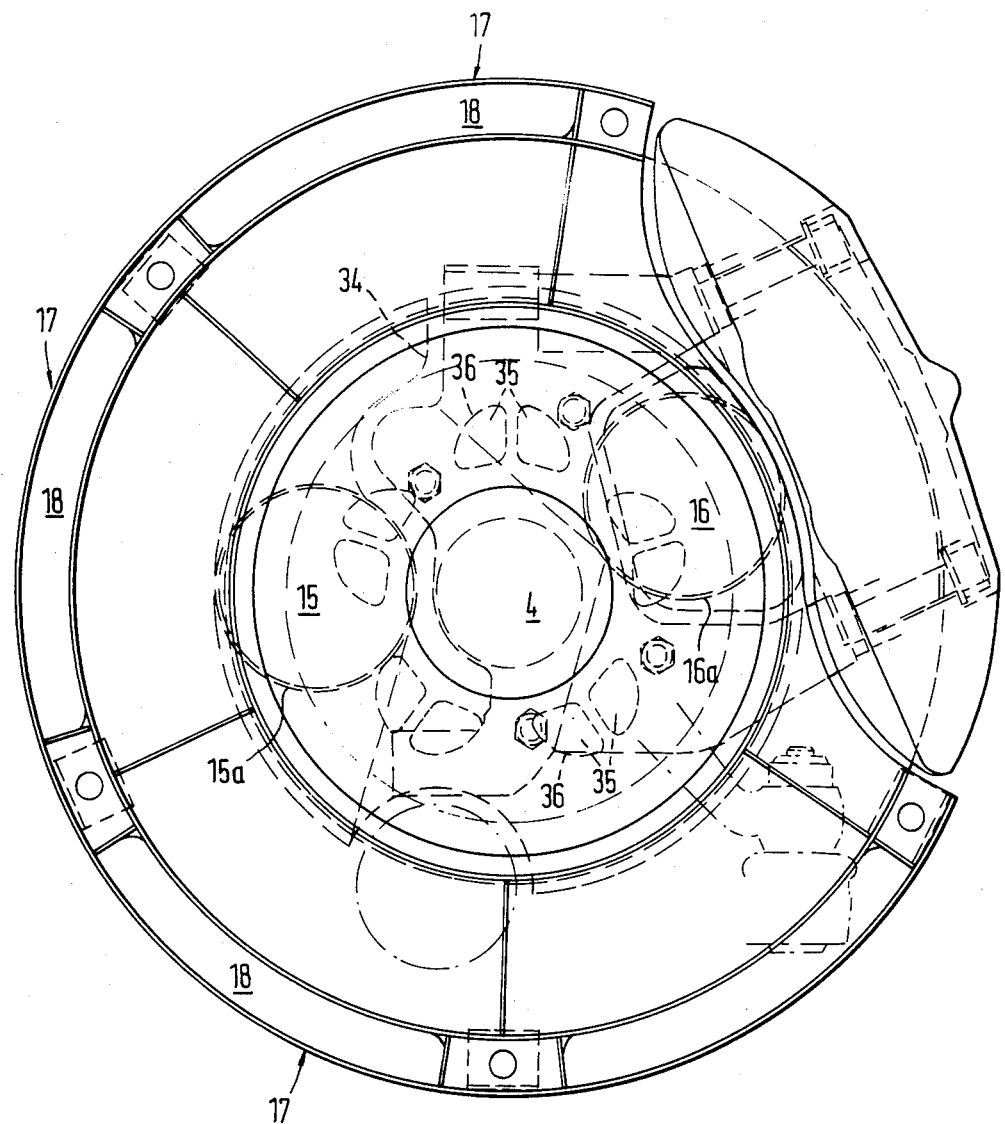
FIG. 2 is a plan view of the invention as seen from the direction indicated by arrow Z of FIG. 1.
Figure 7:
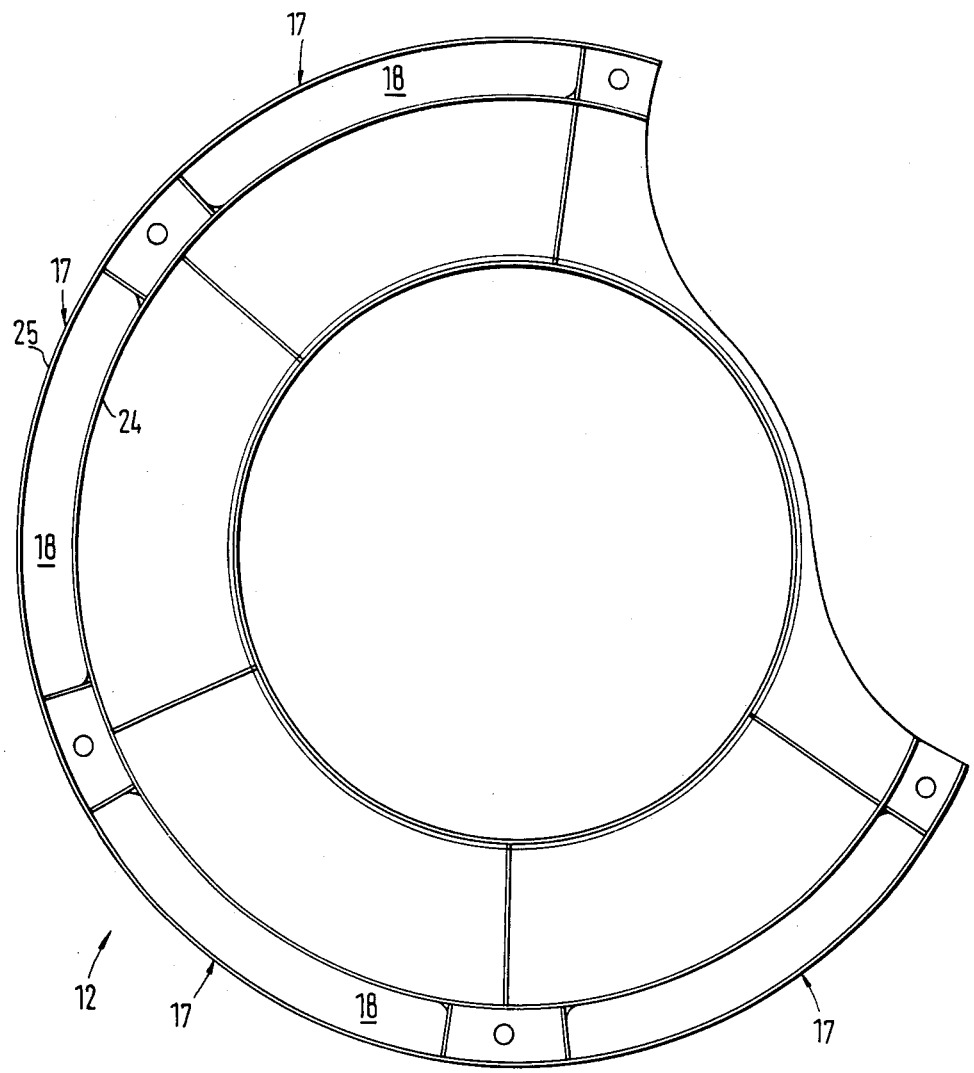
FIG. 7 is a frontal view of the inner member of the housing.

The efflux ducts 17 are disposed radially outwardly of a line 23 corresponding generally to the radially outer rims of the brake discs 3. The efflux ducts 17 are formed by the outer and inner cup-shaped members 11 and 12, and are defined by a generally horizontally disposed radially inner wall 24 and a generally radially disposed peripheral outer wall 24a. The external ducts 13 and 14 are in air-conducting communication with the efflux ducts 17 and terminate at the efflux ducts 17, so that air from the external ducts 13, 14 is conducted into the efflux ducts 17. The efflux ducts 17 are also in air-conducting communication with the radially extending air duct 37 which is disposed between the first and second friction rings 38 and 39. As best shown in FIG. 2, the efflux openings 18 are generally linear with the efflux ducts 17, and the ducts 17 form a generally ring-shaped duct structure.

The wheel hub 4 includes a plurality of hub air ducts, such as overflow ducts 36, which are provided in the radial mounting flange 26 of the wheel hub 4. The overflow ducts 36 are disposed between radially extending ribs 27 in the termination zone of the influx openings 15 and 16. The outlet openings 28 of the overflow ducts 36 terminate at air guide cap 29, so that air from the overflow ducts 36 can be conducted into air guide cap 29. Air guide cap 29 is fixedly joined to the wheel hub 4 and is designed to be freely rotatable with respect to the inner member 12 of housing 10. The air guide cap 29 has a part-spherical, annular bulge air passageway portion 30. Passageway portion 30 provides a means for deflecting air from the outlet openings 28 of the ducts 36 to the annular chamber (duct 14) of the inner member 12 of housing 10. Additionally, the passageway portion 30 conducts air to the radially extending ducts 37 between the friction ring members 38 and 39 of the brake disc 3.

The brake disc 3 is internally vented and includes first and second air inlets 31 and 32. Air inlets 31 and 32 are disposed generally radially inwardly from the friction rings 38, 39 and generally radially outwardly from the portion of the brake disc 3 which is mounted to the wheel hub 4. Air is drawn into inlet 32 from the inner side of the brake disc member 3, and is drawn into inlet 31 from the outer side of the brake disc 3. The inlets 31, 32 are defined by portions of the axially inner surfaces of the friction rings 39 and 38, and by the surfaces of radially extending, slightly arcuately shaped ribs.

Alternatively, it is possible to provide a solid disc brake (not shown) in the housing 10. The solid disc brake could then be subjected to a cooling action by the device of the present invention in a manner generally similar to that illustrated for the internally vented brake disc 3, shown in the drawings.

In order to ensure that an adequate amount of air is available at all times for cooling brake disc 3, an additionally indented air-collection space 33 is provided which is disposed adjacent the influx openings 15 and 16 of the outer member 11. A further indented air-collection chamber 34 is provided which is disposed axially outwardly from space 33, adjacent influx openings 16. The shape of the air-collection chamber 34 is determined largely by the configuration and arrangement of the suspension parts of the wheel guide units which are disposed in the vicinity of the air-collection space 34. Both air-collection spaces 33 and 34 are in air-conducting communication with each other.

The primary cooling air stream 41 enters the housing 10 from the inside of the wheel 1. The air stream 41 enters the housing through the influx openings 15 and 16, and is conducted into the chambers 33 and 34 of the outer member 11. When the air stream 41 leaves the chambers 33 and 34, air stream 41 is divided into four partial cooling air streams a, b, c, and d. Partial cooling stream a is conducted into the second external duct 13 between the friction ring 39 and the wall 19 of outer member 11 to help cool the axially outer surface 21 of the friction ring 39. Partial cooling air stream b is conducted between the radial ribs 27 of the hub 4 and through the inlet 31 to the radially extending ducts 37 between the friction rings 38 and 39 of the brake disc 3, thus providing cooling air to help cool the axially inner surfaces of the friction rings 38 and 39.

Partial cooling air streams c and d are first conducted together through the wheel hub duct 36. From the wheel hub ducts 36, the air is conducted through the passageway 30 formed by the interior of the part-spherical air guide cap 29. The stream is divided into partial cooling air streams c and d after emerging from passageway 30. Air stream c is conducted into the annular chamber (first external duct 14) between the wall 20 of the inner member 12 and the friction ring 38, thereby providing a cooling air stream to the external surface 22 of friction ring 38. Air stream d is conducted via the inlet 32 to the radially extending air duct 37 between friction rings 38 and 39 of brake discs 3. After flowing through their respective ducts on the outside of the friction rings (ducts 13 and 14) and between the friction ring (duct 37) the partial cooling air streams a through d are combined in the efflux ducts 17. The efflux ducts 17 are formed on peripheral side of the brake disc 3, essentially by the inner member 12. These ducts 17 have a generally circular-ring shape, and are in air conducting communication with ducts 13, 14, and 37. The air is discharged to the atmosphere through the external openings 6 in the wheel rim cover 5.

Although the invention has been described in detail with reference to certain preferred embodiments and specific examples, variations and modifications exist within the scope and spirit of the invention as described and as defined in the following claims.

What is claimed is:

1. In a motor vehicle having a wheel including a rim cover portion and at least one opening in the rim cover portion, a wheel hub having a hub air duct through which air can pass and a disc brake unit including a disc member having first and second friction rings and at least one radially extending air duct disposed between the first and second friction rings, a guide means for conducting air into the hub air duct, through the disc brake unit, and out through the at least one rim cover opening for cooling the disc brake unit, comprising an air guide housing means generally enclosing the disc member for forming external air ducts externally of the friction rings, the housing means including influx openings positioned for conducting air to the hub air duct, the external air ducts, and the radially extending air duct, and efflux openings cooperatively positioned with the at least one rim cover opening to conduct air from the housing means to the at least one rim cover opening, wherein said air guide housing includes means disposed radially inwardly of the brake disc friction rings for forcibly directing partial air cooling streams to flow in the radial direction through the at least one radially extending air duct in generally close proximity to the disc member, wherein said external air ducts comprise first and second, axially opposed, radially extending external air ducts and the air guide housing means includes a cup-shaped inner member including said efflux openings and a cup-shaped outer member connected to the cup-shaped inner member and including said influx openings, the disc member being disposed between the inner and outer cup-shaped members.

2. The guide means of claim 1, wherein the first and second friction rings each include an outwardly facing surface, the first and second external air ducts form an annular chamber extending substantially over the entire outwardly facing surfaces of the first and second friction rings, the first external air duct and second external air duct being defined in an axial direction by a wall of the cup-shaped inner member and a wall of the cup-shaped outer member, respectively, and in a radial direction by a peripheral wall of the air guide housing housing means.

3. The guide means of claim 2, wherein the external air ducts have a smaller throughflow cross section than the at least one radially extending air duct between the friction rings.

4. The guide means of claim 1, wherein the air guide housing means includes an inner member wall, disposed adjacent an outer surface of the first friction ring, an outer member wall disposed adjacent an outer surface of the second friction ring, and a peripheral wall disposed radially outwardly from the first and second friction rings, the friction rings and walls defining said external air ducts, the external ducts extending substantially over the entire area of the outer surfaces of the friction rings.

5. The guide means of claim 1, wherein the air guide housing means includes an outer member having a portion forming a pair of air-collecting chambers in air conducting communication with each other, and positioned adjacent said hub air duct for conducting air to said hub air duct, and an influx opening disposed adjacent to one of the pair of air-collecting chambers for conducting air into the one air-collecting chamber.

6. The guide means of claim 5, wherein the hub air duct comprises a plurality of air ducts uniformly distributed in a radial mounting collar of the wheel hub.

7. The air guide means of claim 1, wherein the efflux openings comprise a generally ring-shaped duct means in air-conducting communication with the radially extending air duct and the external air ducts.

8. The guide means of claim 1, wherein the disc member includes a first inlet opening disposed on a first side of the disc member for conducting air from the area adjacent the first side of the disc member to the at least one radially extending duct and a second inlet opening disposed on a second side of the disc member for conducting air from the area adjacent the second side of the disc member to the at least one radially extending duct.

9. The guide means of claim 1, wherein the air guide housing means comprises a synthetic resin.

10. In a motor vehicle having a wheel including a rim cover portion and at least one opening in the rim portion, a wheel hub having a hub air duct through which air can pass and a disc brake unit including a disc member having first and second friction rings and at least one radially extending air duct disposed between the first and second friction rings, a guide means for conducting air into the hub air duct, through the disc brake unit, and out through the at least one rim portion opening for cooling the disc brake unit, comprising an air guide housing means generally enclosing the disc member for forming external air ducts externally of the friction rings, the housing means including influx openings positioned for conducting air to the hub air duct, the external air ducts, and the radially extending air duct, and efflux openings cooperatively positioned with the at least one rim cover opening to conduct air from the housing means to the at least one rim cover opening, wherein the air guide housing means includes an outer member having a portion forming a pair of air-collecting chambers in air conducting communication with each other, and positioned adjacent said hub air duct for conducting air to said hub air duct, and an influx opening disposed adjacent to the one of the pair of air-collecting chambers for conducting air into the one air-collecting chamber, wherein the hub air duct comprises a plurality of air ducts uniformly distributed in a radial mounting collar of the wheel hub, and wherein thr air guide housing includes an inner member having an inner wall, said external air ducts include an external air duct disposed between the inner wall and the first friction ring, and the hub air duct includes outlet openings terminating in an air guide cap, the air guide cap being fixedly positioned with respect to the wheel hub and freely rotatable with respect to said inner member, the air guide cap including means for deflecting air from the outlet openings to said external air duct.

11. The guide means of claim 10, wherein the air guide cap comprises a generally part-spherical member having an interior passageway for conducting air from the outlet openings of the wheel hub to said at least one radially extending air duct between the first and second friction rigns.

12. In a motor vehicle having a wheel including a film cover portion and at least one opening in the rim cover portion, a wheel hub having a hub air duct through which air can pass and a disc brake unit including a disc member having first and second friction rings and at least one radially extending air duct disposed between the first and second friction rings, a guide means for conducting air into the hub air duct, through the disc brake unit, and out through the lat least one rim cover opening for cooling the disc brake unit, comprising an air guide housing means generally enclosing the disc member for forming external air ducts externally of the friction rings, the housing means including influx openings positioned for conducting air to the hub air duct, the external air ducts, and the radially extending air duct, and efflux openings cooperatively positnoned with the at least one rim cover opening to conduct air from the housing means to the at least one rim cover opening, wherein the air guide housing means includes an outer member having a portion forming a pair of air-collecting chambers in air conducting communication with each other, and positioned adjacent said hub air duct for conducting air to said hub air duct, and an influx opening disposed adjacent to one of the pair of air-collecting chambers for conducting air into the one air-collecting chamber;

wherein the hub air duct comprises a plurality of air ducts uniformly distributed in a radial mounting collar of the wheel hub, and wherein the hub air ducts include inlet openings extending between radial ribs of the wheel hub for guiding air toward at least one radially extending air duct disposed between the first and second friction rings.

13. The guide means of claim 12, wherein the air guide housing includes an inner member having an inner wall, said external air ducts include an external air duct disposed between the inner wall and first friction ring, and the hub air duct includes outlet openings terminating in an air guide cap, the air guide cap being fixedly positioned with respect to the wheel hub and freely rotatable with respect to said inner member, the air guide cap including means for deflecting air from the outlet opening to said external air duct.

14. In a motor vehicle having a wheel including a rim cover portion in at least one opening in the rim cover portion, a wheel hub having a hub air duct through which air can pass and a disc brake unit including a disc member having first and second friction rings and at least one radially extending air duct disposed between the first and second friction rings, a guide means for conducting air into the hub air duct, through the disc brake unit, and out through the rim cover opening for cooling the disc brake unit comprising an air guide housing means generally enclosing the disc member for forming external air ducts externally of the friction rings, the housing means including influx openings positioned for conducting air to the hub air duct, the external air ducts, and the radially extending air duct, and efflux openings cooperatively positioned with the at least one rim cover opening to conduct air from the housing means to the at least one rim cover opening, wherein said external air ducts comprise first and second, axially opposed, radially extending external air ducts, the hub air duct extends axially for conducting air from a first side of the disc member to a second side of the disc member, and wherein air which is conducted through said influx openings is divided into four partial air cooling streams, the four partial air cooling streams including a first partial air cooling stream which is conducted into the second external air duct, a second partial air cooling stream which is conducted through a first air inlet into the at least one radially extending air duct, a third partial air cooling stream which is conducted through the hub air duct into the at least one radially extending air duct and a fourth partial air stream which is conducted into the first external air duct.

* * * * *